Feb. 8, 1955
N. W. NORMAN
2,701,740
WHEEL STRUCTURE
Filed June 13, 1952
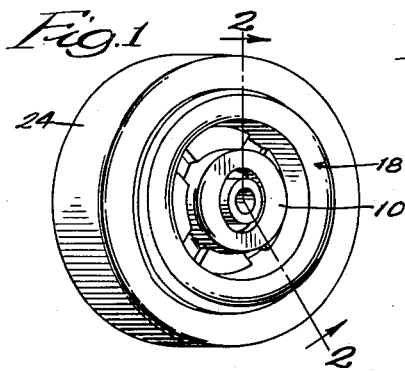
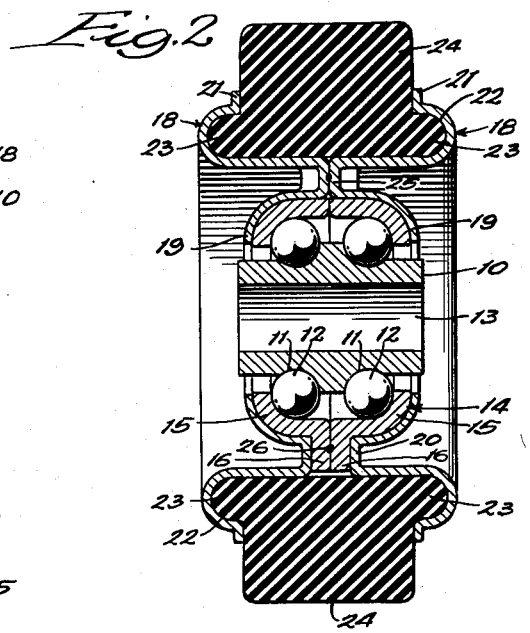
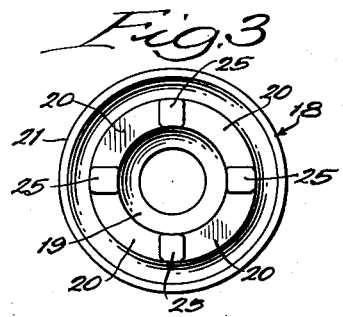
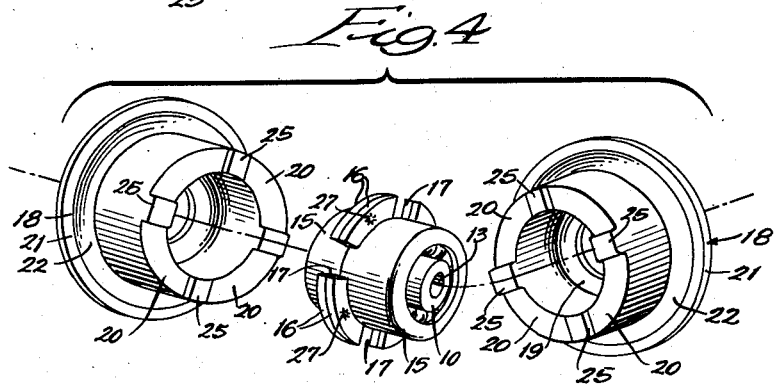
INVENTOR:
Norman W. Norman,
BY
Dawson & Ome,
ATTORNEYS.

United States Patent Office 2,701,740
Patented Feb. 8, 1955

2,701,740

WHEEL STRUCTURE

Norman W. Norman, Park Ridge, Ill., assignor to Edward A. Grange, Chicago, Ill.

Application June 13, 1952, Serial No. 293,285

5 Claims. (Cl. 301—5.7)

This invention relates to a wheel and a method of assembling the same. The wheel has utility with various types of rolling equipment such as carts, hospital chairs and equipment, as a caster wheel, a roller skate wheel, etc.; and will be described herein with particular reference to its use as a roller skate wheel.

In the past, numerous wheel structures, as described above, have been used but none has satisfactorily solved the problem of providing a wheel structure that can be quickly and easily assembled in a minimum of time while still providing a rigid and sturdy wheel not prone to become weakened and loose through normal usage. This is especially true of roller skate wheels.

An object, then, of this invention is to provide a method of assembling a wheel structure in a minimum of operations and a minimum of time. Another object of the invention is to provide a method of assembling a roller skate wheel structure wherein the parts are pressed together and then welded to provide a rigid, easily assembled structure. Still another object is to provide a roller skate wheel having great strength and that will not become loose and wabbly through normal use and wear. A further object of the invention is to provide a roller skate wheel having a pair of peripheral flanges with abutting portions providing means for rigidly securing together the parts of the wheel. Still a further object is to provide a roller skate wheel that cannot easily be taken apart nor will it come apart when exposed to extremely rugged usage. Other objects and advantages will appear as the specification proceeds.

A preferred embodiment of my invention is illustrated by the accompanying drawing, in which—

Figure 1 is a perspective view of the roller skate wheel embodying my invention; Fig. 2, a cross-sectional view taken on the line 2—2 of Fig. 1; Fig. 3, a side view in elevation of a peripheral flange; and Fig. 4, an exploded perspective view showing the bearing cage and peripheral flanges in spaced-apart relation.

Referring particularly to Fig. 2, a roller skate wheel embodying my invention is seen to consist of a cone or bearing race 10 providing grooves or channels 11 in which are mounted a plurality of ball bearings 12. The cone 10 is equipped with an axially-extending bore 13 adapted to receive an axle (not shown) providing a mounting for the wheel. Enclosing the cone 10 and the bearings 12 is an annular bearing cage or retainer 14. The bearing cage 14 consists of a pair of identical cage halves or portions 15. Each of the cage halves 15 is equipped adjacent its inner end with a plurality of spaced-apart ears 16. The ears 16 of each bearing cage half 15 abut the ears of the opposite cage half when the halves are brought together and enclose the bearings. The mating ears 16 provide slots 17 between adjacent ears.

Mounted upon the bearing cage 14 are a pair of peripheral flanges 18. The flanges 18 include an annular hub 19 having an outwardly-extending flange or end wall 20 formed integrally therewith and being turned outwardly and again upwardly and inwardly to form a tread retainer 21. The flange 20 constitutes a rib interposed between the hub 19 and tread retainer 21. The tread retainer 21 is shaped to provide an annular recess or groove 22 receiving an annular shoulder 23 with which a tread 24 is equipped. The tread 24 is preferably made of a resilient material such as hard rubber and may be made from natural or synthetic rubber or various compositions thereof. Any of the well known treads may be employed, including treads of wood, leather and other suitable materials.

The inner end walls or flanges 20 are equipped with a plurality of inwardly-extending shoulders 25 positioned in spaced-apart relation and adapted to align with the slots 17 between adjacent ears 16. When the peripheral flanges 18 are assembled with the bearing cage 14, the shoulders 25 of each of the end walls 20 enter the slots 17 until the end walls 20 abut the ears 16 and the shoulders 25 abut those of the opposite end wall. The abutting shoulders 25 may then be fastened together to provide a rigid wheel structure.

Any suitable and well known material may be used to form the various parts of the wheel structure. I prefer to use a metal such as steel that may be stamped or pressed into the required shapes while still providing a rugged roller skate wheel. In addition, the abutting shoulders 25 may be then secured together by welding, such as by spot welds 26.

In assembling the wheel structure, the cone 10 having the bearings 12 positioned in the grooves or channels 11 is inserted into the cage halves 15. The cage halves 15 are rotated until the opposite ears 16 are brought into alignment and are in abutting relationship, and the ears are then fastened together such as by welds 27. The peripheral flanges 18 are then pressed into position upon the cage 14, after the shoulders 23 of the tread 24 have been partially inserted within the annular recesses 22. The shoulders 25 are aligned with the slots 17. The end walls or flanges 20 are brought into abutting relationship with the ears 16 and at the same time the shoulders 25 of each end wall abut the opposite shoulder within the slots 17. The mating shoulders 25 are then rigidly secured together as by spot welding, etc., as shown at 26. The assembly is accomplished quickly and easily with a minimum of difficulty, and a sturdy structure results. The tread 24 is snugly and firmly held within the retainers 21 while the bearing cage and cone assembly is rigidly and securely held within the hubs 19.

If desired, the peripheral flanges 18 may be assembled with the bearing cage and bearing assembly by pressing the two flanges together and welding the abutting shoulders 25 as part of a single operation. This method has the advantage of minimizing the handling operations. However, it is a simple procedure to first press the parts together and subsequently weld the abutting shoulders 25 as a separate operation.

The assembled wheel may then be mounted upon an axle of a roller skate with the opposite ends of the cone 10 frictionally engaging an edge of the roller skate mounting, etc., and the retaining means, such as a nut. For this purpose the cone 10 extends slightly beyond the bearing cage and hub 19 on each side.

The peripheral flanges 18 comprising the hubs 19 and tread retainers 21 may be stamped or pressed on suitable dies, etc., with the inwardly-extending shoulders 25 in the flanges 20 as a single operation. The bearing cage halves 15 may also be stamped or pressed upon dies, etc.

It is seen that I provide a wheel structure and method of assembly that eliminates the use of ears and slots as a means for fastening the two peripheral flanges together. The difficulty and time involved in aligning such structures and threading the ears into the slots is therefore eliminated. Rather, I provide a quick and inexpensive method of assembly, and by dispensing with the use of bendable ears, etc., for securing the peripheral flanges, I have lessened the possibility of the parts coming apart that normally results from strenuous use, as in roller skates, since I do not employ ears that have been severely weakened by the bending and fastening operation. I provide, then, a wheel of great strength that may be economically assembled on a mass production basis.

While in the foregoing specification I have described in considerable detail for purposes of illustration a wheel structure and method of assembling the same, it will be understood that the details of my invention may be varied widely by those skilled in the art without departing from the spirit and scope of my invention.

I claim:

1. In a wheel structure, a bearing cage, a cone rotatably mounted therein and being provided with a bore therethrough adapted to receive an axle, said cage being equipped with a plurality of laterally-extending spaced-apart ears providing slots therebetween, a pair of hubs equipped adjacent their inner ends with flanges adapted to substantially abut said spaced ears, said flanges having a plurality of spaced shoulders adapted to be received within said slots, means for fastening said shoulders together, and a tread mounted upon said hubs.

2. In a wheel structure of the character described, a bearing cage, bearings within said cage, a cone rotatably mounted in said cage upon said bearings and having a bore therethrough adapted to receive an axle, said cage being equipped intermediate its ends with a plurality of laterally-extending ears spaced apart to provide slots therebetween, a pair of hubs equipped adjacent their inner ends with outwardly-turned flanges adapted to substantially abut opposite sides of said spaced ears, said flanges being equipped with a plurality of inwardly-extending spaced-apart shoulders aligned with said slots, the shoulders provided by each flange substantially abutting the shoulders of the opposite flange, said abutting shoulders being rigidly secured together, and a tread mounted upon said hubs.

3. A roller skate wheel, comprising a cone equipped with bearing races and having a bore therethrough adapted to receive an axle, bearings within said races, an annular cage substantially enclosing said bearings and being rotatably mounted thereon, said cage being provided midway between its ends with a plurality of ears extending outwardly therefrom in substantial alignment and being spaced apart to provide slots between adjacent ears, a pair of annular hubs adapted to receive opposite ends of said cage and having integral inner end walls extending outwardly and terminating in a tread retainer, said end walls having thereon a plurality of inwardly-projecting shoulders aligned with said slots and adapted to abut the shoulders of the opposite hub when said cage is received within said hubs, means for rigidly uniting said abutting shoulders, a tread, and means for securing said tread to said hubs.

4. A roller skate wheel, comprising a cone having a bore therethrough for receiving an axle, bearings mounted upon said cone, and a pair of cage halves rotatably mounted upon said bearings, each of said cage halves being equipped adjacent their inner end with laterally-extending ears, said ears being spaced apart to provide slots therebetween and adapted to abut the ears of the opposite cage half when said cage halves are mounted upon said bearings, a pair of peripheral flanges mounted upon said cage halves and providing a hub, tread retainer and a rib interposed therebetween, said ribs being equipped with a plurality of spaced-apart shoulders adapted to be received within said slots whereby the shoulders of one rib abut those of the other rib, means for rigidly uniting the abutting shoulders, and a tread within said tread retainer.

5. In a roller skate wheel having a bearing cage rotatably mounted by bearings upon an axle, said cage being equipped with a plurality of laterally-extending, circumferentially-spaced ears providing slots therebetween, a pair of hubs mounted upon said cage, each having a rib provided with a plurality of spaced shoulders aligned with said slots and adapted to be received therein whereby the shoulders of one rib abut the shoulders of the other rib in said slots, the abutting shoulders being rigidly secured together, and a tread mounted upon said hubs.

References Cited in the file of this patent

UNITED STATES PATENTS

| | | |
|---|---|---|
| 1,673,364 | Joslin | June 12, 1928 |
| 1,757,116 | Dunne | May 6, 1930 |
| 2,071,080 | Marshall | Feb. 16, 1937 |
| 2,500,886 | Torkelson | Mar. 14, 1950 |
| 2,596,771 | Harbour | May 13, 1952 |